(No Model.)
G. WESTINGHOUSE, Jr.
ELECTRIC RAILWAY SYSTEM.
No. 579,527. Patented Mar. 23, 1897.
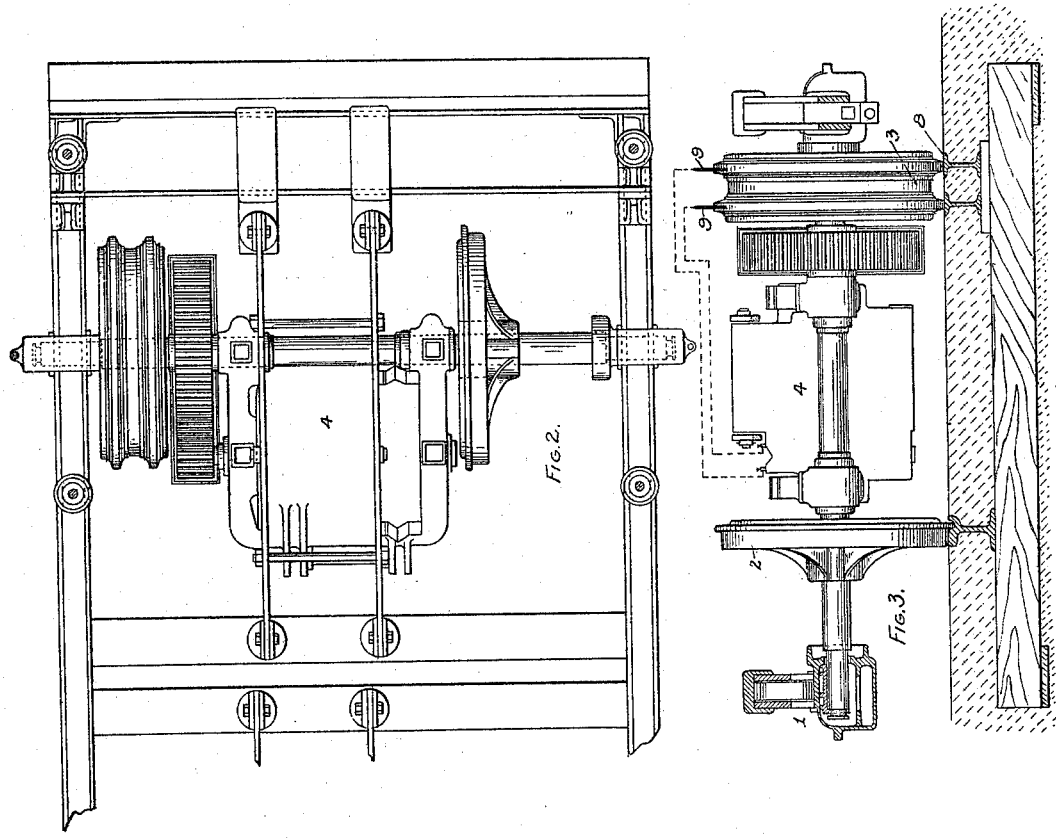
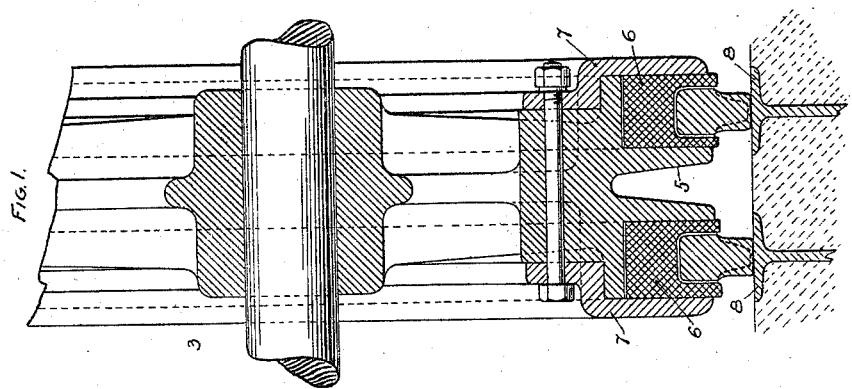
WITNESSES:
INVENTOR.
George Westinghouse Jr.
BY Terry and MacKay
ATTORNEYS.

UNITED STATES PATENT OFFICE.

GEORGE WESTINGHOUSE, JR., OF PITTSBURG, PENNSYLVANIA.

ELECTRIC-RAILWAY SYSTEM.

SPECIFICATION forming part of Letters Patent No. 579,527, dated March 23, 1897.

Application filed February 19, 1894. Serial No. 500,722. (No model.)

*To all whom it may concern:*

Be it known that I, GEORGE WESTINGHOUSE, Jr., a citizen of the United States, residing in Pittsburg, in the county of Allegheny and State of Pennsylvania, have invented a new and useful Improvement in Electric-Railway Systems, (Case No. 576,) of which the following is a specification.

My invention relates to electric railways, and more particularly to a novel arrangement of running-gear for electric cars and of the means for collecting the electric current necessary for driving car-motors.

One object of my invention is to provide a form of railway which shall cause the minimum obstruction to street traffic.

Another object of my invention is to provide a novel means whereby the car may be supported and supplied with electricity by the same wheels in such a manner as to insure easy riding and at the same time do away with extra devices for current collection.

My invention is illustrated in the accompanying drawings, wherein—

Figure 1 is a partial vertical transverse section of one of my novel collecting-wheels. Fig. 2 is a plan of the motor and wheel arrangement at one end of a car, and Fig. 3 is an elevation of what is shown in Fig. 2.

The principal feature of my invention is the overhanging of one of the boxes 1 on one side of the rails, whereby one set of wheels 2 is made to carry the greater part of the load, as they are nearer the center of gravity of the car, the remaining wheels 3 being simply used to steady the car.

The motor (indicated at 4) is supported in any desired well-known manner, as, for instance, for single reduction, as indicated, and it may itself be of any desired form known in the art.

The guidance of the car is accomplished by means of the coöperation of a grooved rail and flanged wheel 2, as is usual, while the wheel 3, being designed for a double purpose, is preferably run upon flat I-beams or rails, as shown. This arrangement gives a smooth and easy running upon curves, as a great freedom of lateral movement is permitted in the case of the wheels 3, and the guide-wheels are limited to one longitudinal series. These wheels 3 are preferably constructed as shown in Fig. 1, where the rim 5 of the body of the wheel is shown cut away for the reception of thick rubber tires 6. Other insulating materials may of course be used in place of rubber. These tires are held in place in any desired manner, as, for instance, by means of the retaining-plates 7, bolted, as shown, or otherwise securely fastened to the body of the wheel.

While I have shown and described one wheel 3, provided with two sets of tires, I do not wish to be understood as limiting my invention to this precise construction, it being evident that the same result might be secured by various different but equivalent means which would be within the spirit and scope of my invention.

Surrounding the rubber tires and preferably let into them for better insulation, as shown, are two conducting or collecting tires made of hardened copper, steel, or phosphor-bronze. Indeed any suitable metal may be employed.

The function of the rubber tires is then to insulate the collecting-tires from each other and the wheel and also by their elasticity to provide for an even bearing of the two upon their respective rails in spite of any accidental unevenness.

The two terminals of the driving-dynamo are connected to the two conducting and supporting rails 8, and the current is carried by means of the metal tires and brushes 9 to the motor 4, as indicated. This method of current-supply is particularly adapted to systems wherein large currents are transmitted at low potential, and wherein insulated sections of rails are used which are only cut into circuit when the car is over them.

If desired, the tires may be reduced in breadth at their bearing-surfaces, as indicated in dotted lines in Fig. 1, for the purpose of cutting any snow or ice which may be upon the rails.

I do not desire to be understood as limiting myself to the specific details as illustrated and described herein, as many obvious changes may be made therein without departing from the spirit of my invention.

What I claim is—

1. A street-railway built with flat rails on one side constituting electric supply and return conductors, and grooved supporting and guiding rails on the other side, substantially as described.

2. An electric railway having two lines of flat conducting and supporting rails at one side constituting the supply and return conductors, and a single line of grooved supporting-rails at the other side, substantially as described.

3. An electric car provided with supporting and guiding wheels at one side, and with supporting and conducting wheels at the other side, in combination with flat supply and return conducting-rails for said conducting-wheels, and grooved rails for said guiding and supporting wheels, substantially as described.

4. An electric car provided with supporting and guiding wheels at one side and with supporting and conducting wheels at the other side, the former being nearer the center of gravity than the latter, substantially as described.

5. In an electric car, a supporting and conducting wheel, two conducting-tires thereon, and insulating material between said tires and said wheel, substantially as described.

6. In an electric car, a supporting and conducting wheel, two conducting-tires thereon, and rubber tiring in which said conducting-tires are placed, substantially as described.

7. In an electric car, a supporting and conducting wheel, two rubber tires thereon and a conducting-tire on each of said rubber tires, substantially as described.

In testimony whereof I have hereunto subscribed my name this 15th day of February, A. D. 1894.

GEO. WESTINGHOUSE, JR.

Witnesses:
WM. G. WATT,
HAROLD A. MACKAYE.